United States Patent [19]

Ohkawa

[11] Patent Number: 4,948,497
[45] Date of Patent: Aug. 14, 1990

[54] ACOUSTICALLY FLUIDIZED BED OF FINE PARTICLES

[75] Inventor: Tihiro Ohkawa, La Jolla, Calif.

[73] Assignee: General Atomics, San Diego, Calif.

[21] Appl. No.: 195,203

[22] Filed: May 18, 1988

[51] Int. Cl.$^5$ ............................................. B07B 3/00
[52] U.S. Cl. ......................................... 209/1; 55/15;
   55/277; 73/865.5; 73/505; 181/153; 209/11; 209/422
[58] Field of Search .................. 209/1, 11, 422, 2;
   55/277, 15; 73/324, 866, 865.5 X, 863.23, 505;
   181/153; 210/478

[56] References Cited

U.S. PATENT DOCUMENTS

| | | | |
|---|---|---|---|
| 3,076,544 | 2/1963 | Bodine | 209/1 |
| 3,076,547 | 2/1963 | Bodine | 209/1 X |
| 3,109,721 | 11/1963 | Zenner et al. | 209/1 X |
| 4,520,656 | 6/1985 | Barmatz et al. | 73/505 |
| 4,523,682 | 6/1985 | Barmatz et al. | 209/422 X |
| 4,549,435 | 10/1985 | Barmatz et al. | 73/505 |
| 4,743,361 | 5/1988 | Schram | 209/1 |
| 4,759,775 | 7/1988 | Peterson et al. | 75/15 |

FOREIGN PATENT DOCUMENTS

| | | | |
|---|---|---|---|
| 3218488 | 11/1985 | Fed. Rep. of Germany | 209/1 |
| 0021638 | 2/1981 | Japan | 209/1 |

OTHER PUBLICATIONS

*Sonics* by Hueter and Bolt, pp. 219–225.
Whymark et al., "Acoustic Levitation Materials Processing", Jan. 1979.
"Ultrasonic Desliming and Upgrading of Ores" S. C. Sun et al., Jun., 1956, pp. 639–644.

*Primary Examiner*—Donald T. Hajec
*Attorney, Agent, or Firm*—Nydegger & Harshman

[57] ABSTRACT

An apparatus to acoustically fluidize a bed of fine particles comprises a generally box-shaped hollow chamber. An acoustic source is located at the bottom of the chamber and a convection inhibiting heater is located at the top of the chamber. An acoustic wave is directed from the source into the chamber to levitate and suspend fine particles within the chamber at determinable distances from the acoustic source according to the intensity and frequency of the acoustic wave.

16 Claims, 1 Drawing Sheet

ACOUSTICALLY FLUIDIZED BED OF FINE PARTICLES

BACKGROUND OF THE INVENTION

This invention pertains to fine particle separators and filters. More particularly, the present invention pertains to devices which use acoustic wave energy for segregating very fine particles according to their size or weight. This invention is particularly, but not exclusively, useful for sorting and segregating particles which are less than ten (10) microns in diameter.

DISCUSSION OF THE PRIOR ART

It is well known that gas flow can be used to support or suspend objects. Further, gas flow is known to be useful for fluidizing a bed of particles. Accordingly, many examples can be given where objects are levitated by, or suspended within, a volume of moving gas. A problem arises, however, when the objects or particles to be suspended by the gas flow are very small, e.g less than ten (10) microns in diameter. With such fine particles, the gas flow velocity which will suspend the particles is very low. In fact, even natural convection velocities are often sufficient to accelerate these particles in any direction. Obviously, under such conditions, the ability to observe suspended particles is next to impossible because there can be no effective gas flow control over the positioning of the particles. It follows that some means, other than gas flow, is needed to suspend and control the positioning of fine particles within a gaseous medium.

The present invention recognizes that fine particles can be suspended by acoustic waves within a gaseous medium while any movement or flow of gas is effectively suppressed. This is so because an acoustic wave is, itself, capable of exerting steady forces on fine particles. Further, according to the location of the particles relative to the wave, these acoustic forces will counteract the gravitational force. Research indicates that four kinds of forces are exerted by an acoustic wave on a particle. Briefly, these are: radiation pressure (scattering), average viscous force, wave distortion (second harmonics) and hydrodynamic force.

When considering the free body diagram of a suspended particle, the resultant force of all components in the acoustic wave which act against the particle must be equal and opposite to the gravitational force. It is sufficient for purposes here to recognize that each of the four force components of the acoustic wave has a different effect on the particles depending on their size. For larger particles, i.e. particles with sizes comparable to or larger than the wavelength of the acoustic wave, the radiation pressure component is predominant. Conversely, the radiation pressure is relatively unimportant for particles less than about ten microns, even at the highest achievable frequencies. It has been found, however, that the second harmonic is predominant when the particle size is less than the wavelength of the acoustic wave, down to particle diameters of a few tenths of a micron. With the second harmonic, an effective momentum exchange occurs with the particle which can suspend the particle within a motionless medium. Importantly, the second harmonic requires less acoustic wave intensity than is required by the radiation pressure to be effective. Thus, power requirements are also consequently lower. For very fine particles, i.e. those less than 0.2 microns in diameter, the viscous force predominates to draw the very fine particles toward the acoustic source. We are interested here, however, in those particles which can be suspended by the second harmonic.

For an acoustic wave of given constant intensity, the dispersion of particles will be affected both by the intensity level, as determined by the distance of the particle from the acoustic source, and the frequency of the wave. It is known that higher frequency waves are more damped than waves of lower frequency. The consequence is that the intensity gradient in higher frequency waves is steeper and, therefore, different intensity levels will be closer together. Thus, a higher frequency wave will tend to bunch the particles together. On consequent spreading of the intensity levels and a resultant the other hand, lower frequency waves are less damped with a dispersion between particles. This fact allows tuning of the acoustic source in both intensity and frequency to suspend particles of a particular size at a determinable distance from the acoustic source. A more complete appreciation of these force components and their relationships is found with reference to T. F. Hueter and R. H. Bolt, Sonics (John Wiley & Sons, New York 1955).

In light of the above, it is an object of the present invention to provide a device which will levitate or suspend fine particles within a motionless gaseous medium by an acoustic wave. Another object of this invention is to provide means for suspending fine particles of a particular weight or size at a determinable distance from an acoustic power source. Still another object of the present invention is to provide a means for observing the characteristics of fine particles while they are suspended essentially motionless in a gaseous medium. Yet another object of the present invention is to provide means for sorting and segregating fine particles according to their size and weight. Another object of the present invention is to provide an apparatus for fluidizing a bed of fine particles which may be easily manufactured in a relatively cost effective manner.

SUMMARY OF THE INVENTION

A preferred embodiment of the apparatus used to fluidize a bed of fine particles comprises a hollow box-shaped chamber which has an acoustic wave source mounted in its bottom or base wall. A heater is mounted at the top of the chamber to establish an inverted temperature gradient therein which is intended to prevent and inhibit convection currents within the chamber. The inside walls of the chamber are lined with an acoustic absorbing material to minimize or eliminate reflected acoustic waves.

The acoustic wave source is preferably a speaker whose intensity can be controlled according to the desires of the operator to suspend or levitate fine particles in the generated acoustic wave at determinable distances from the speaker according to the particle's size or weight. In an alternate embodiment of the present invention's apparatus for fluidizing a bed of fine particles, the acoustic source may comprise a plurality of speakers disposed on the bottom of the chamber to establish a shaped progressive wave in the chamber. In accordance with the placement of these speakers, the progressive wave can effectively create an acoustic depression in which fine particles are confiningly suspended according to size and weight. A strobe light can be directed into the chamber to illuminate the suspended particles and an optical viewer can be provided to observe the fine particles while they are in a suspended state.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
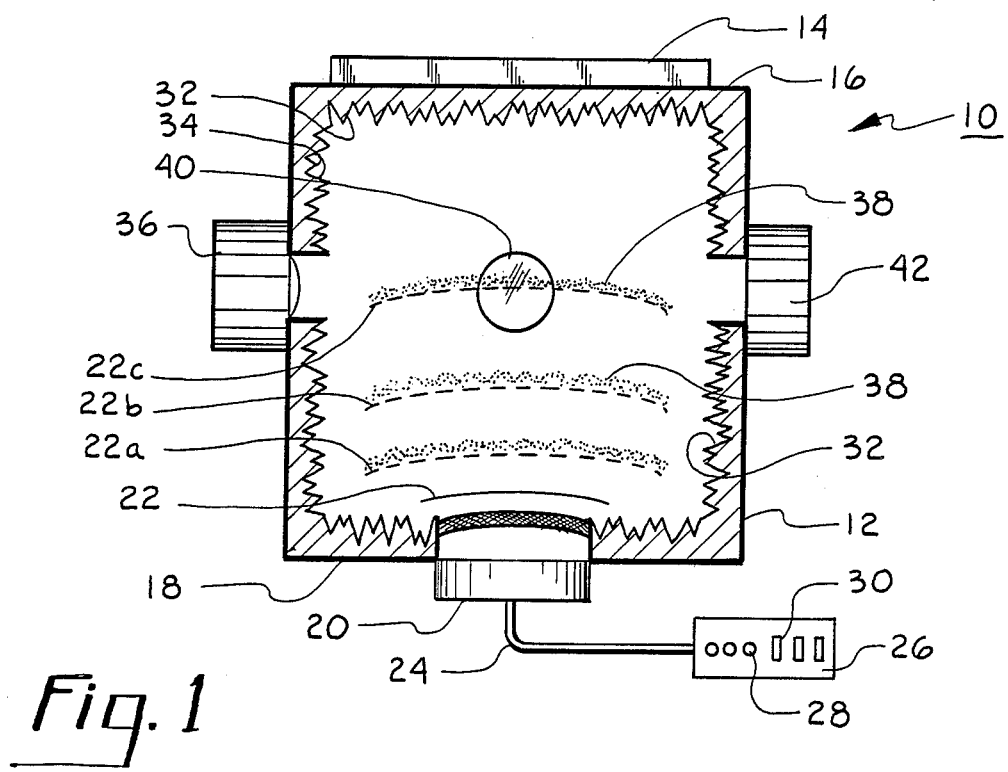
FIG. 1 is a front elevational view of the present invention with its chamber shown in cross-section for clarity.

Referring initially to FIG. 1, the apparatus for fluidizing a bed of fine particles is shown and generally designated 10. As can be appreciated from cross-referencing FIG. 1 with FIG. 2, apparatus 10 comprises a hollow box-shaped chamber 12. Although chamber 12 is shown as being box-shaped in both FIG. 1 and FIG. 2, it will be appreciated that chamber 12 may be cylindrically-shaped or shaped in any of several ways, according to the desires of the operator, without departing from the intent and spirit of the present invention.

In FIG. 1, a heater 14 is shown mounted on the top wall 16 of chamber 12. Heater 14 may be of any well known type which provides sufficient heat to establish a temperature inversion that will suppress and inhibit the creation of convective currents within chamber 12. An acoustic source 20 is positioned on the bottom wall 18 of chamber 12 to direct an acoustic wave 22 into the chamber 12. As will be readily appreciated by the skilled artisan, acoustic source 20 can be either a single sound speaker or a plurality of sound speakers. Acoustic source 20 is connected via electronic cable 24 to a control panel 26 which has knobs 28 and switches 30 that can be hooked-up in any manner well known in the art to control the characteristics of wave 22. Specifically, control panel 26 can be used to control the intensity and the frequency of the acoustic wave 22.

FIG. 1 also shows that the interior surface of chamber 12 is covered with an acoustic absorber 32 which is intended to minimize the effect of wave 22 reflections from this interior surface. More particularly, acoustic absorber 32 can be any of several materials which are known to be very efficacious for the intended purpose. Further, as shown in FIG. 1, acoustic absorber 32 can be formed with surface irregularities 34 which will help to scatter and disperse the incident acoustic wave 22 and thereby greatly reduce reflectivity from this interior surface of chamber 12. This is necessary in order to minimize the disruptive effect any acoustic reflections might have on the suspended particles 38.

Chamber 12 also comprises a stroboscopic light source 36 which directs light into chamber 12 to illuminate the fine particles 38 which are suspended within chamber 12 by the action of acoustic wave 22. A viewing port 40 is provided on the side of chamber 12 between top 16 and bottom 18 to permit observation of fine particles 38 while they are suspended by acoustic wave 22 in chamber 12. A microscope (not shown) can be mounted at viewing port 40 for observation of particles 38 against the dark background of the interior of chamber 12. Light from stroboscopic light source 36 will be lateral and can be modulated at the same frequency as acoustic wave 22 to enhance observation.

Chamber 12 may also have a withdrawal means 42 mounted thereon for retrieving fine particles 38 from chamber 12. This withdrawal means 42 can be of several types and can include means for sucking particles 38 from chamber 12. Withdrawal means 42 can also include magnetic or adhesive means to which particles 38 will adhere for removal from chamber 12.

Figure 2:
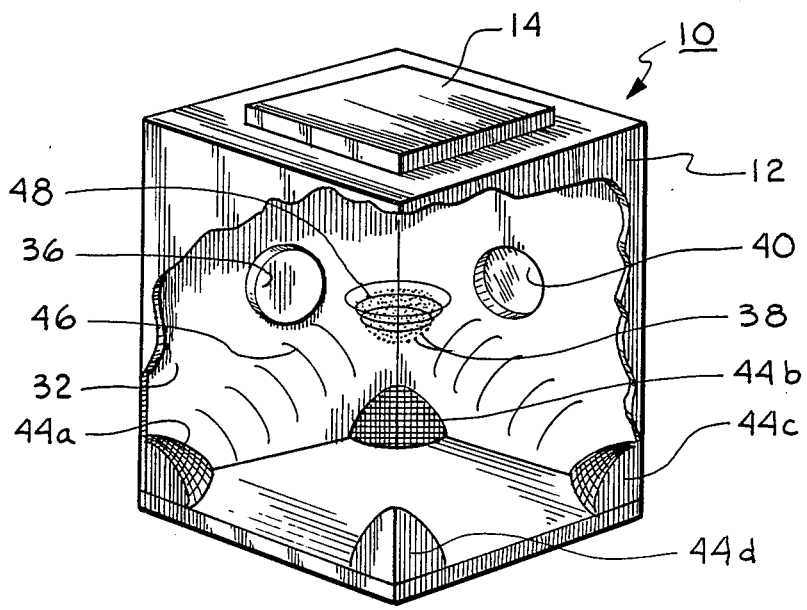
FIG. 2 is a perspective view of the chamber of the present invention with portions broken away for clarity to show an alternate embodiment of the acoustic source.

In an alternate embodiment of the present invention, acoustic source 20 may comprise a plurality of speakers 44. As shown in FIG. 2, speakers 44a, 44b, 44c and 44d are respectively disposed in each of the bottom corners of chamber 12. It will be understood, however, that this arrangement is only exemplary. The actual arrangement of speakers 44 in chamber 12 is dependent only on the particular desires of the operator. When in the configuration shown in FIG. 2, it is known that speakers 44a, 44b, 44c and 44d will establish a progressive wave 46 which effectively creates an acoustic depression 48 in which particles 38 will be suspended. This particular configuration is useful in that it helps prevent migration of particles 38 from the interior of chamber 12 toward the acoustic absorber 32 on the sides of chamber 12.

It is to be appreciated that the distance from sound source 20 at which the fine particles 38 are levitated in chamber 12 is effectively independent of the configuration of speakers in sound source 20. Instead, in accordance with the previously disclosed general discussion of acoustic forces on fine particles 38, these particles 38 will levitate within chamber 12 according to the intensity and frequency of acoustic wave 22 or acoustic wave 46. Preferably, the intensity of the acoustic wave 22 or 46 will be on the order of one (1) to twenty-four (24) watts per square meter, i.e. approximately 120 to 134 db, and the frequency of the wave will be between one (1) and one hundred (100) KHz. Various levels 22a, 22b and 22c for the acoustic wave 22 are shown in FIG. 1. The particular level at which a fine particle 38 will be effectively suspended depends on the size and weight of the particle in its relationship to the intensity and frequency of the wave 22. For example, for a given wave intensity, the fine particles 38 suspended at wave level 22c, shown in FIG. 1, will be smaller than those suspended at wave level 22a. On the other hand, particles 38 can be raised from wave level 22a to wave level 22c by increasing the intensity of acoustic wave 22. Further, as the frequency of wave 22 is increased, the levels 22a, 22b and 22c will be closer together. Conversely, lowering the frequency will cause levels 22a, 22b and 22c to spread apart providing greater dispersion between particles 38 of different size and weight. Thus, apparatus 10 can be effectively used to either segregate particles 38 according to their size and weight or identify particles 38 of a particular size.

OPERATION

In the operation of apparatus 10 of the present invention, particles 38 (or a medium containing suspended particles 38) are placed within chamber 12. When unsuspended particles 38 are introduced into chamber 12, they can be placed directly on acoustic source 20. An acoustic wave 22 is generated at acoustic source 20 and controlled by the manipulation of knobs 28 and switches 30 on control panel 26 according to the desires of the operator. As the intensity of wave 22 is increased, particles 38 will be levitated into chamber 12 and suspended therein. In accordance with calibrated means incorporated into control panel 26, the intensity of wave 22, and thus the pressure exerted on particles 38, can be controlled to vary the equilibrium position of the particles 38 within chamber 12. Because wave intensity decreases proportionately with the distance from acoustic source 20, particles 38 of greater size and weight will be at equilibrium closer to acoustic source 20 than those of lesser size and weight. With this control, particles 38 can be sorted within chamber 12 according to their size and weight.

Changing the frequency of acoustic wave 22 affects the dispersion of particles 38 within chamber 12. Specifically, as frequency is increased there will be greater damping of acoustic wave 22 and the various intensity levels will be closer together. Conversely, lowering the frequency of acoustic wave 22 effectively spreads the various intensity levels to disperse particles 38 throughout chamber 12.

Particles 38 which are levitated or suspended within chamber 12 can be illuminated by stroboscopic light 36 and observed through viewing port 40. Further, suspended particles 38 can be withdrawn from chamber 12 for further observation and study by withdrawal means 42.

While the particular apparatus for fluidizing a bed of fine particles as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. An apparatus to acoustically fluidize a bed of fine particles which comprises:
   a chamber for confining said particles in a substantially motionless gaseous medium, said chamber having a top and a bottom;
   a sound source mounted on said bottom of said chamber for directing an acoustic wave into said chamber to suspend said particles on said wave therein;
   means for adjusting the intensity of said wave to vary the distance of said suspended particles from said sound source in said chamber; and
   an acoustic absorber effectively lining the interior of said chamber.

2. An apparatus as cited in claim 1 wherein said sound source comprises at least one speaker.

3. An apparatus as cited in claim 2 wherein said sound source comprises a plurality of speakers disposed on said bottom of said chamber to shape said acoustic wave.

4. An apparatus as cited in claim 3 further comprising:
   a strobe light mounted on said chamber to illuminate the interior of said chamber; and
   optical means mounted on said chamber for observing said particles in said chamber.

5. An apparatus as cited in claim 4 further comprising calibrated means for correlating the distance of a particular sized particle from said sound source according to the intensity of said wave.

6. An apparatus as cited in claim 5 further comprising means to vary the frequency of said acoustic wave to disperse said particles.

7. A fine particle filter which comprises:
   a hollow chamber having a top and a bottom for confining said particles in a substantially motionless gaseous medium;
   means mounted on said bottom of said chamber for generating an acoustic wave;
   means for adjusting the intensity of said wave to vary the distance of said particles at predetermined locations in said chamber according to the size of said particles;
   a heater mounted on the top of said chamber to inhibit convection currents within said chamber; and
   an acoustic absorber effectively lining the interior of said chamber.

8. A fine particle filter as recited in claim 7 wherein said wave generating means is at least one speaker.

9. A fine particle filter as recited in claim 8 wherein said wave generating means comprises a plurality of speakers disposed on said bottom of said chamber to shade said acoustic wave.

10. A fine particle filter as recited in claim 9 further comprising:
    a strobe light mounted on said chamber to illuminate the interior of said chamber; and
    optical means mounted on said chamber for observing said particles in said chamber.

11. A fine particle filter as recited in claim 10 further comprising means mounted on said chamber for withdrawing similar sized particles therefrom.

12. A fine particle filter as recited in claim 10 further comprising means mounted on said chamber for withdrawing particles of similar weight therefrom.

13. A fine particle filter as recited in claim 12 further comprising means to vary the frequency of said acoustic wave to disperse said particles.

14. A method for segregating fine particles according to size which comprises the steps of:
    generating an acoustic wave in a hollow chamber having a top and a bottom;
    directing said acoustic wave into said chamber from the bottom thereof;
    heating said chamber from the top thereof to inhibit convection currents therein; and
    setting the intensity of said wave to position particles within said chamber at a distance from said bottom of said chamber according to the size of said particles.

15. A method as recited in claim 14 further comprising the step of withdrawing similar sized particles from said chamber.

16. A method as recited in claim 15 further comprising the step of shaping the wave to establish a progressive wave depression within said chamber to hold similar sized particles in said depression.

* * * * *